United States Patent [19]
Keeney et al.

[11] Patent Number: 5,846,463
[45] Date of Patent: Dec. 8, 1998

[54] ENCAPSULATED FIXED WINDOW MODULE FOR A MOTOR VEHICLE

[75] Inventors: John D. Keeney, Fremont, N.H.; David S. Todd, Belleville, Mich.

[73] Assignee: Kingston-Warren Corporation, Farmington Hills, Mich.

[21] Appl. No.: 662,555

[22] Filed: Jun. 13, 1996

[51] Int. Cl.⁶ .......................... B29C 33/12; B29C 33/14; B29C 33/42; B29C 45/14
[52] U.S. Cl. .......................... 264/135; 264/261; 264/265; 264/271.1; 264/277
[58] Field of Search .................... 264/259, 260, 264/261, 263, 271.1, 134–135, 275, 277, 279, 279.1, 265; 425/121, 123, 129.1

[56] References Cited

U.S. PATENT DOCUMENTS

| | | | |
|---|---|---|---|
| 4,561,625 | 12/1985 | Weaver | 264/252 |
| 4,662,113 | 5/1987 | Weaver | 264/252 |
| 4,834,931 | 5/1989 | Weaver | 264/277 |
| 4,861,540 | 8/1989 | Nieboer et al. | 264/276 |
| 4,953,331 | 9/1990 | Ziegler et al. | 52/208 |
| 5,139,307 | 8/1992 | Koops et al. | 296/201 |
| 5,248,179 | 9/1993 | Biermacher et al. | 296/146 |
| 5,261,721 | 11/1993 | Conger et al. | 296/146 |
| 5,464,575 | 11/1995 | Jaffiol et al. | 264/277 |

*Primary Examiner*—Angela Ortiz
*Attorney, Agent, or Firm*—Dykema Gossett PLLC

[57] ABSTRACT

A window module has a fixed-pane window which is encapsulated by a molded trim piece having an integral portion which extends around an adjacent movable window opening. The integral trim is formed of EPDM. The window module is constructed by placing a window pane, a division post and the end of an extruded EPDM trim strip into a mold into which EPDM is injected to integrate and encapsulate the inserts.

20 Claims, 3 Drawing Sheets

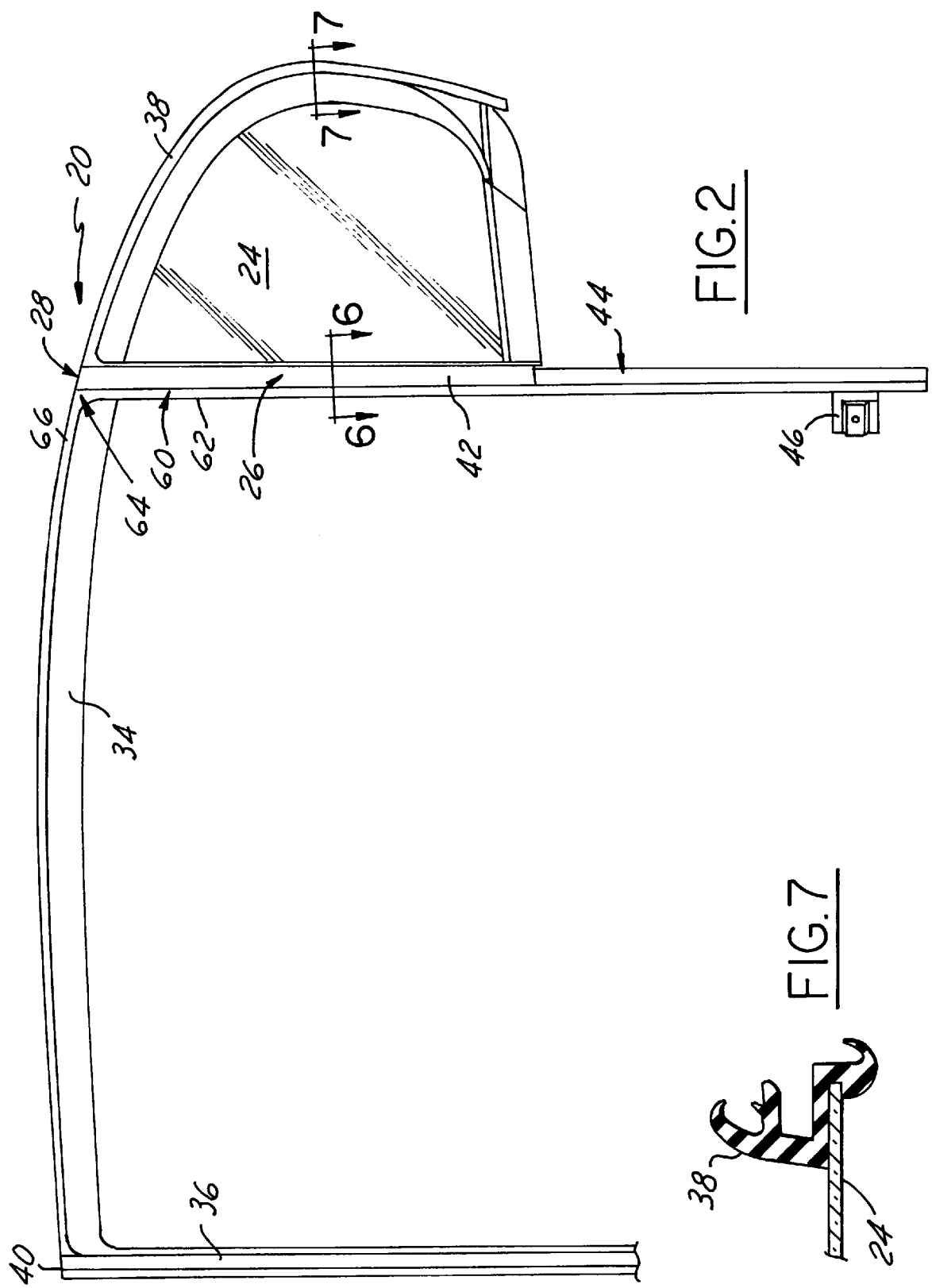

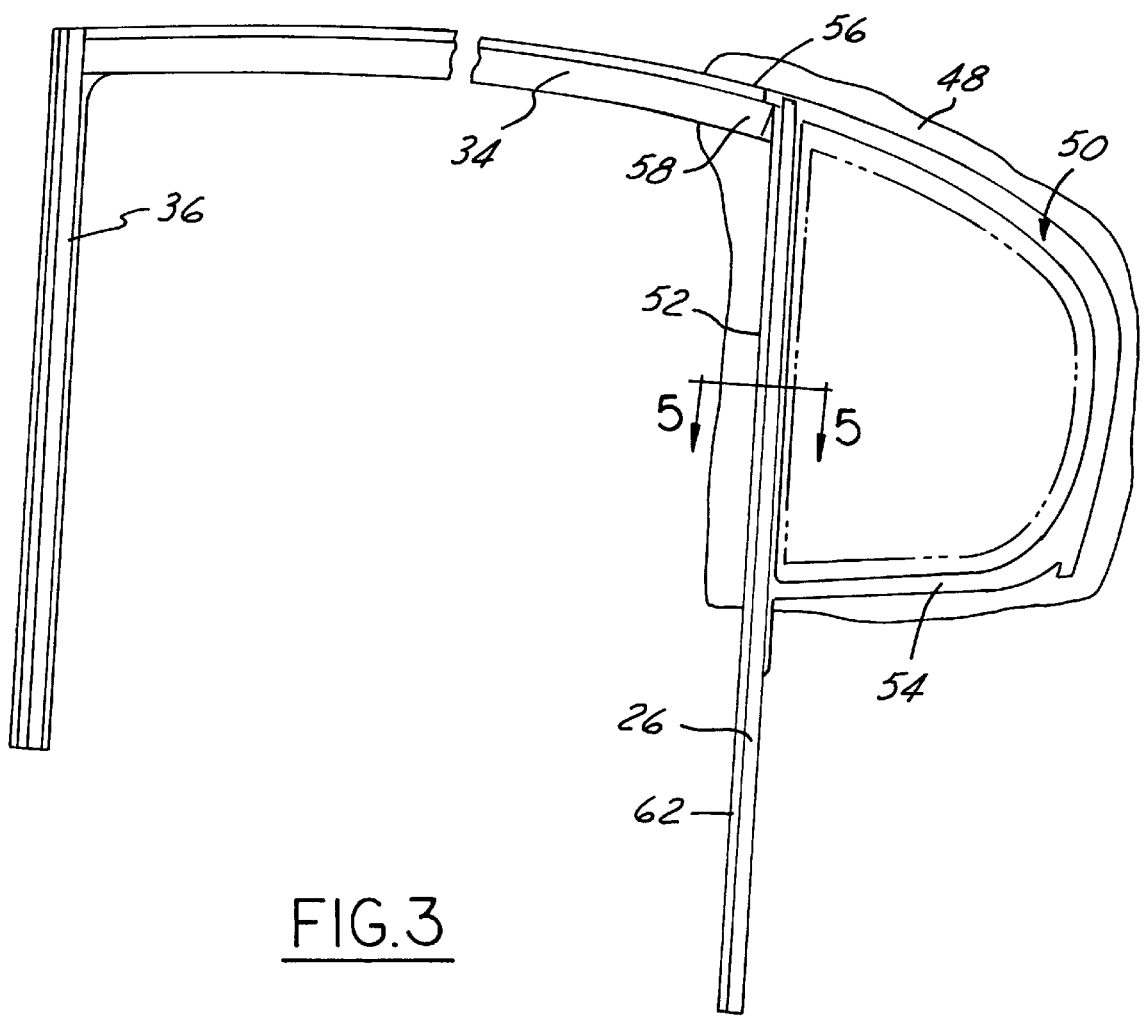
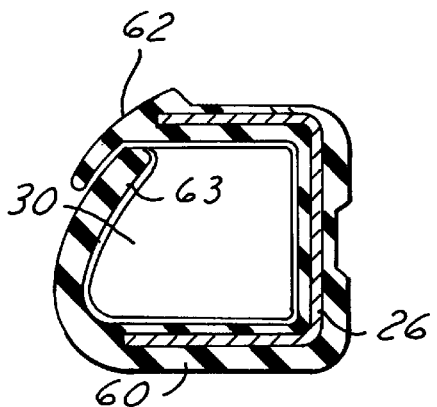
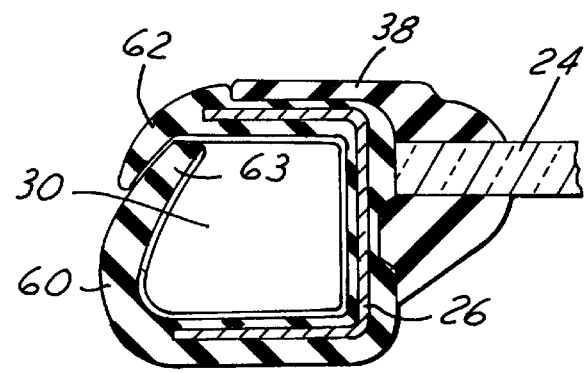

ENCAPSULATED FIXED WINDOW MODULE FOR A MOTOR VEHICLE

TECHNICAL FIELD

The present invention relates generally to motor vehicle window module designs and methods of making such modules and, more specifically, relates to the problems associated with the assembly of fixed window modules from discrete trim components.

BACKGROUND OF THE INVENTION

In a number of motor vehicles, the rear door assembly is designed such that there is a forward window opening that carries a retractable window pane and a rearward opening that is equipped with a fixed window pane. Rear fixed windows of conventional design may be assembled from discrete elements that include the window panel, a rear post that serves as a track for an adjacent movable window and various configurations of moldings or trim pieces, most specifically an extruded header/B-pillar trim piece that may be mechanically attached to the window module assembly using an interlocking channel or the like. The trim in some prior art designs comprises an article in the nature of a pre-formed resilient band. In those designs, the window is inserted into a channel of the trim band which resiliently engages the window pane, but often less than securely. Conventional designs suffer from a number of deficiencies due to their assembly from discrete components such as water leakage, wind noise and problems generally with fit and finish. In addition, the assembly of these modules is often difficult, particularly where the individual components are manufactured by more than one supplier.

A few of the problems of conventional designs are overcome through the use of molding processes by which a portion of the trim surrounding the window panel is fabricated by encapsulating the window periphery with a polymer using injection molding techniques. In essence, the window panel is placed in a mold cavity which is configured to produce a circumferential trim at the panel edges. The edges of the panel on which the injection molded trim will adhere are cleaned and primed to promote adhesion and to create a water-impervious seal in the formed article. The mold is then closed and the material is injected such that the window panel edges are encapsulated to form the desired trim geometry. From a quality standpoint, however, materials such as PVC and RIM used in prior art designs are somewhat undesirable when compared with the more resilient materials used for body sealing applications. Moreover, the use of plastics for encapsulation of the window pane and then the attachment thereto of a discrete rubber header strip trim using an interlocking channel or the like results in (1) an unwanted visual appearance caused by using two different polymeric materials and (2) the potential for water leakage and wind noise at the connection areas.

In U.S. Pat. No. 5,139,307, there is provided a fixed window assembly having an encapsulated pane. The assembly includes an elongated, rigid, channel support, a panel-like sheet, and a molded gasket of resinous material. The resinous material extends around the periphery of the pane and the outer surface of the channel support to join the sheet and support member into a panel unit. The header trim or weather strip must be separately connected to the finished panel assembly. U.S. Pat. No. 5,261,721, discloses an opaque or transparent panel assembly for a motor vehicle window which includes a panel having a peripheral edge that is encased by a molded gasket. U.S. Pat. No. 4,953,331 discloses a stationary window arrangement for a motor vehicle door in which a holding web, window pane, holding rail and seal are fabricated in a single operation.

Thus, there is a need in the art for a fixed window/trim module which provides an encapsulated window pane where the trim is a resilient material, which provides the necessary header strip without the need to attach the strip as a discrete element and which joins the header sealing lips to the division post sealing lips to form continuous seals around the corner of the movable glass. The present invention provides a method and apparatus which meets this need.

SUMMARY OF THE INVENTION

In one aspect, the present invention provides a method of manufacturing a fixed-pane motor vehicle window module. The module is constructed in a single injection molding operation in which the pane, division post and header trim strip are used as inserts in a mold cavity. A portion of the division post and the majority of the header trim strip extend out of the mold. The window pane is received in a cavity in the mold and the division post and header strip are placed in their respective positions in the mold relative to the window pane. The mold is then closed and a resin is injected into the mold cavity which forms an encapsulating trim around the window and a portion of the post. In addition, the injected resin bonds with the end of the header trim strip in the mold to form an integral bond between the injection molded encapsulating trim and the header trim strip and the end of the division post trim. After the injected polymer has cured, the mold is opened and the window module is removed. The injected polymer is preferably EPDM.

Thus, in one aspect the method of the present invention includes the steps of providing a window pane, a division post, a header trim strip and a mold having various cavities for receiving the window pane, a portion of the post and one end portion of the header trim strip; placing the window pane, the division post and the header in their respective portions in the mold cavity and placing any attachment brackets or the like in the mold; closing the mold; injecting a polymeric material into the mold to encapsulate a portion of window pane and a portion of the post with the polymeric material and to integrally bond the end portions of the header trim strip and division post trim with the polymeric material; allowing the polymer to cure and form an encapsulated fixed window pane assembly having an integral header strip; and removing the encapsulated fixed window pane assembly having an integral header strip from the mold.

In another aspect the present invention provides a motor vehicle fixed window pane module having a motor vehicle window pane, a division post adjacent one edge of the window pane; and an encapsulating trim, encapsulating the circumferential edges of the window pane and a portion of the division post. The encapsulating trim is formed of a polymeric material and has an elongated header trim strip extending away from the post and the window, the header strip has a horizontal portion and a vertical portion, the vertical portion forming a B-pillar trim.

In still another aspect, the post is roll-formed and has a channel for receiving a movable window pane; the header trim strip is extrusion-formed and the encapsulating material, the header trim strip and the division post trim are all formed of the same material.

BRIEF DESCRIPTION OF THE DRAWINGS

FIG. 2 is a back elevational view of the fixed window module of the present invention.

FIG. 3 is a fragmentary plan view of the open mold used in the present invention with the division post, window pane and header trim strip in position for molding.

FIG. 5 is a cross sectional view along line 5—5 of FIG. 4.

FIG. 6 is a cross sectional view along line 6—6 of FIG. 2.

FIG. 7 is a cross sectional view along line 7—7 of FIG. 2.

DETAILED DESCRIPTION OF THE PREFERRED EMBODIMENTS OF THE INVENTION

Figure 1:
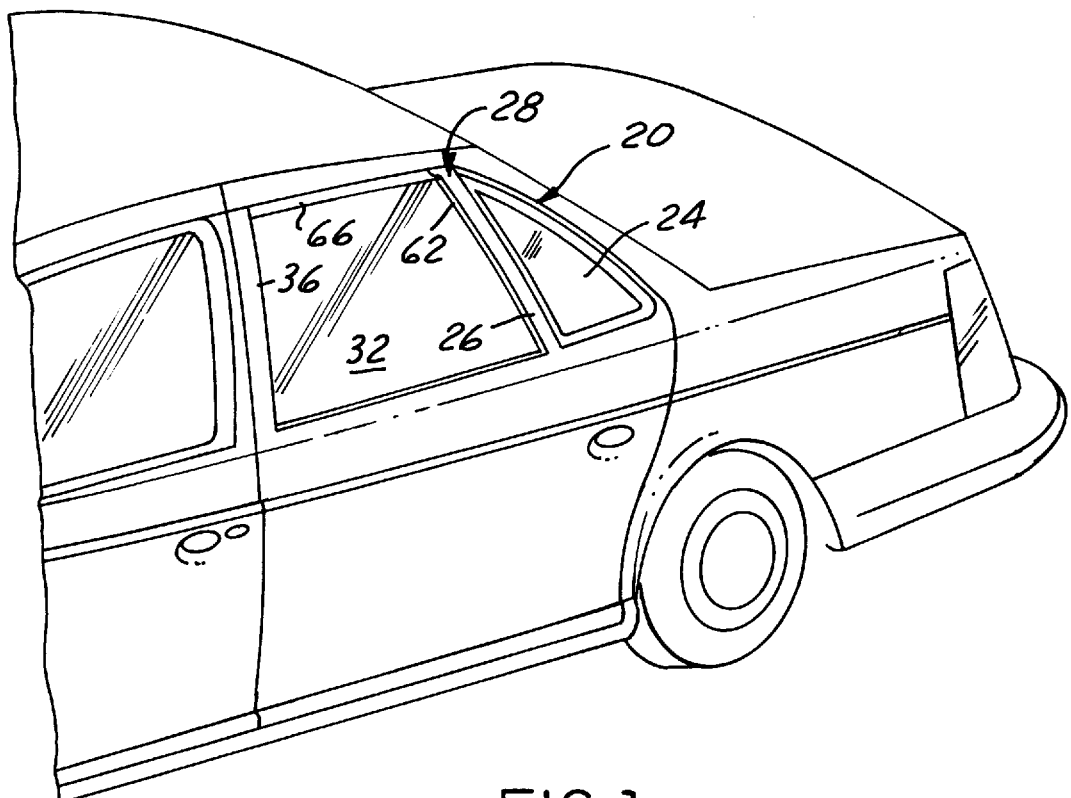
FIG. 1 is a fragmentary, perspective view of the fixed window module of the present invention installed in a motor vehicle.

Referring now to FIG. 1 of the drawings, the fixed panel assembly of the present invention is shown in one preferred embodiment as fixed window module 20 in motor vehicle 22. In FIG. 2, a rear door window module 20 is shown isolated from motor vehicle 22. Rear door window module 20 has window pane 24, division post 26 and integrated trim 28. Although a number of materials may be suitable in a particular application for window pane or panel 24, in most applications window pane 24 will comprise a conventional clear or tinted automotive glass pane, but may also be formed of plastic such as polycarbonate or other glazing type material.

Division post 26, and referring now also to FIGS. 1, 2 and 5 of the drawings, is generally rectangular in cross section and most preferably comprises a roll-formed metal post which defines channel 30 for receiving a movable window pane (shown as window pane 32 in FIG. 1). Division post 26 has an associated D-post trim, i.e., EPDM coextruded trim 60 having an outside lip portion 62 and an inside lip portion 63 (shown in FIGS. 5 and 6). As will be understood, D-post trim lip 62 forms a sealing surface on the outside surface of movable pane 32 along the rear edge of pane 32. As explained more fully hereinafter, inside D-post lip 63 seals the inside surface of movable pane 32. Division post 26 serves the conventional functions of support for pane 24, for separating movable window pane 32 from fixed pane 24 and for guiding movable window pane 32 via sliding contact in channel 30. Co-extruded trim 60 will preferably have a low-friction coating or flocked strip associated therewith to permit the movable pane 32 to slide more easily.

As stated in the background of the invention, pre-molded trims into which glass panes are inserted are often undesirable, as is the mechanical fastening of extruded trim to encapsulated window modules. Accordingly, in the present invention rear door window module 20 is provided having integrated trim 28 which is not only securely attached to window pane 24 by virtue of being molded thereon, but which also has fully integrated header 34 and B-pillar portions 36 as will be fully described hereinafter. Accordingly, header extrusion or header trim strip 34 extends from encapsulation portion 38 of integrated trim 28. B-pillar extrusion or portion 36 is attached to header extrusion 34 at corner 40, which will typically have an angle of approximately 90–110 and most preferably 110 degrees. In most applications header trim strip 34 and B-pillar portion 36 will be extruded as either a single piece or as two separate pieces which are bonded together at corner 40. In most applications of the present invention, header extrusion 34 and B-pillar portion 36 will be formed of ethylene propylene diene rubber (EPDM), styrene butadiene rubber (SBR), or other thermoset or thermoplastic polymers. Most preferred is EPDM. Various processing aids and other additives may be appropriate for use in combination with the preferred polymers. Most preferably, integrated trim 28 will be formed of the same preferred materials. As will be recognized by those skilled in the art, the length of header trim strip 34 will be dictated by the vehicle design, for example from about 12 to about 36 inches.

Division post 26 in the completed rear window module has an encapsulated portion 42 and a non-encapsulated portion 44, the latter of which extends outside the mold cavity during fabrication. Mounting bracket 46 is provided, shown attached to division post 26 in the conventional manner. It is to be understood that additional mounting brackets and the like will ordinarily be present on rear window module 20 but could also apply to front doors. In addition, bracket 46 is shown as representative of all such mounting hardware.

Referring now to FIG. 2, an important aspect is the bonding of D-post trim lip 62 to header extrusion 34 at corner 64. That is, header lip 66 is joined by the molded polymer to D-post trim lip 62 to form a continuous radial trim region which fits securely around and against the corner of movable pane 32. This eliminates a serious flaw (inadequate seal) present in prior art designs. The injection molded material, therefore, fills in the space between header lip 66 and trim lip 62 to form the radial portion at corner 64. It will be understood that header extrusion 34 and D-post trim 60 have inside lips and outside lips for sealing movable window pane 32, i.e., the outside lips 62 and 66 and the inside lip 63 of D-post trim 60 (the inside lip of header extrusion 34 not being shown for convenience). The inside lips are similarly joined at the radius (corner 64) by the injection molded polymer.

Referring now to FIG. 3 of the drawings, a fragment of mold 48 is shown having a mold space 50 which comprises several regions or spaces as will now be described. Mold space 48 is configured to receive window pane 24 (shown in phantom) a portion of division post 26 and an end portion of header trim strip 34. Accordingly, mold space 50 comprises division post receiving portion 52, window pane receiving space 54 and header extrusion receiving portion 56. That is, mold space 50 accommodates window pane 24, a portion of division post 26 and a portion of header trim strip 34 as inserts in the mold cavity. The geometry of these various insert regions or spaces in mold 48 will be a function of the geometry of the inserts. Mold 48 is provided with the appropriate seal region to retain the molded polymeric material within mold space 50.

Figure 4:
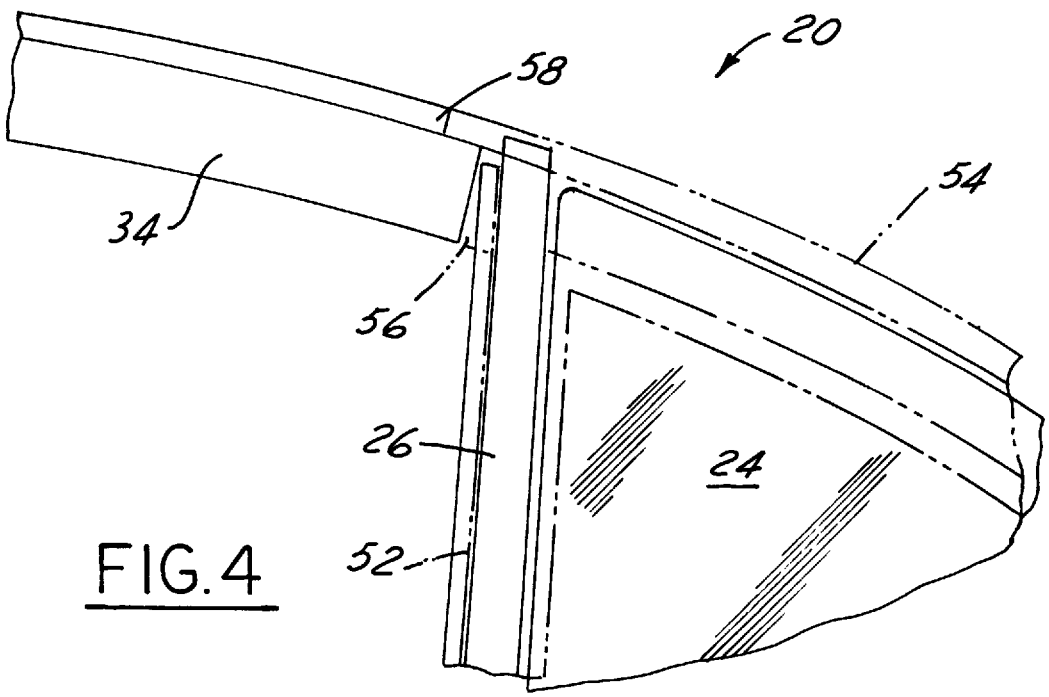
FIG. 4 is a fragmentary front elevational view of a portion of the fixed window module of the present invention illustrating the integration of the header trim strip, the window pane and the post with the injected encapsulation portion of the trim being shown in phantom.

In FIG. 4 of the drawings, a fragmentary portion of mold space 50 is shown in phantom to highlight the relative placement of window pane 24, division post 26 and end 58 of header trim strip 34. As will now be understood, a key feature of the present invention is providing a mold space 50 which accepts end 58 of header extrusion 34 so that once the EPDM is injected, the molded EPDM joins with EPDM header trim strip 34 and D-post trim lip 62 and encapsulates window pane 24 to form a single unitary trim 28. It is preferred that header trim strip 34 extend into mold space 50 from about 1 to about 3 inches. Mold slides are preferably used to facilitate injection and sealing of the inserts, particularly strip 34 and post 26, in the mold. The bonding of the molded portion of trim 28 to header trim strip 34 and D-post trim lip 62 results in integral joints; it was discovered by the present inventors that the bonds appear to span the joints and are generally as strong as the trim at any point.

The various injection molding parameters such as the temperature of the polymer, injection and dwell times, the pressures, sprue design and gating are not unique to the present invention and appropriate values will be recognized by those skilled on the art based on the teachings provided by the present invention. For example, a cure (vulcanizing) temperature of from about 320° F. to about 500° F. is appropriate for use with EPDM. It is generally preferred to clean and prime the edges of pane 24 prior to molding.

In FIG. 5, FIG. 6 and FIG. 7, preferred profiles in one particular application of the present embodiment are shown. Accordingly, roll-formed post 26 is shown in FIG. 5 with coextruded EPDM polymer 60. That is, as stated earlier, post 26 is most preferably formed and then coextruded with EPDM rubber trim 60 prior to construction of module 20. Suitable coextrusions are EPDM, SBR, and other thermosets and thermoplastics. Most preferred is EPDM. In FIG. 6, the interfacial bond between coextruded trim 60 and molded or encapsulated portion 38 is seen as is the relative position of window pane 24. Molded or encapsulated portion 38 provides tight positive retention of window pane 24. FIG. 7 illustrates the encapsulation of window pane 24 by the injected EPDM in a particular configuration of trim.

Thus, it is apparent that there has been provided in accordance with the invention a method and apparatus that fully satisfies the objects, aims and advantages set forth above. While the invention has been described in connection with specific embodiments thereof, it is evident that many alternatives, modifications, and variations will be apparent to those skilled in the art in light of the foregoing description. Accordingly, it is intended to embrace all such alternatives, modifications and variations that fall within the spirit and broad scope of the appended claims.

What is claimed is:

1. A method of fabricating a fixed-pane motor vehicle window assembly, comprising the steps of:
   providing a window pane;
   providing a division post having a channel adapted to receive a movable window pane;
   providing a header trim strip adapted to contact said movable window pane;
   providing a mold having a mold cavity, said mold cavity having a space for receiving said window pane, a space for receiving said division post and a space for receiving an end portion of said header trim strip;
   placing said window pane in said window pane-receiving space of said mold cavity;
   placing said division post in said division post-receiving space of said mold cavity;
   placing one end of said header trim strip into said header trim strip end portion-receiving space of said mold cavity;
   closing said mold;
   injecting a resin into said mold to encapsulate a portion of said window pane and a portion of said division post with said resin and to form a radial trim region integrally bonding said end portion of said header trim strip with said resin, said radial trim region adapted to seal a portion of said movable window pane;
   allowing said resin to cure to form an encapsulated fixed window pane assembly having an integral header strip; and
   removing said encapsulated fixed window pane assembly having an integral header strip from said mold.

2. The method of fabricating a fixed-pane motor vehicle window assembly recited in claim 1, wherein said division post has an associated co-extruded trim having at least one sealing lip and wherein said header strip has at least one sealing lip and wherein said resin joins said sealing lip of said co-extruded trim and said sealing lip of said header strip by forming said radial trim region.

3. The method of fabricating a fixed-pane motor vehicle window assembly recited in claim 1, wherein said division post is roll-formed metal coextruded with EPDM rubber.

4. The method of fabricating a fixed-pane motor vehicle window assembly recited in claim 1, wherein said window pane is selected from the group consisting of glass, plastic and other glazing materials.

5. The method of fabricating a fixed-pane motor vehicle window assembly recited in claim 2, wherein the edges of said window pane are primed prior to placing said window pane in said window pane receiving space.

6. The method of fabricating a fixed-pane motor vehicle window assembly recited in claim 1, wherein said header trim strip is extrusion-formed.

7. The method of fabricating a fixed-pane motor vehicle window assembly recited in claim 1, wherein said header trim strip has a length of from about 12 to about 36 inches.

8. The method of fabricating a fixed-pane motor vehicle window assembly recited in claim 1, wherein said resin is selected from the group consisting of EPDM, SBR and other thermoset and thermoplastic polymers and combinations thereof.

9. The method of fabricating a fixed-pane motor vehicle window assembly recited in claim 1, wherein said header trim strip is formed of the same material as said cured resin.

10. The method of fabricating a fixed-pane motor vehicle window assembly recited in claim 8, wherein said division post is at least partially coextruded with EPDM material prior to being placed in said post-receiving space of said mold cavity.

11. The method of fabricating a fixed-pane motor vehicle window assembly recited in claim 1, wherein said header trim strip has a longitudinal axis and has about a 90–110 degree bend along said longitudinal axis forming a B-pillar portion and wherein said header trim strip is adapted to contact said movable window pane along at least two edges of said movable window pane.

12. A method of making a fixed window module for a motor vehicle, comprising the steps of
   providing a glass window pane;
   providing a post having a channel adapted to receive a movable window pane, said post having a resilient trim portion;
   providing an extruded elongated header trim strip adapted to contact said movable window pane;
   providing a mold having a mold cavity, said mold cavity having a space for receiving said glass window pane, a space for receiving said post and a space for receiving an end portion of said extruded elongated header trim strip;
   placing said glass window pane in said window pane-receiving space of said mold cavity;
   placing said post in said post-receiving space of said mold cavity such that one edge of said post contacts one edge of said glass window pane and such that a portion of said post extends out of said mold;
   placing one end of said extruded elongated header trim strip into said header trim strip end portion-receiving space of said mold cavity such that a portion of said extruded elongated header strip extends out of said mold;

closing said mold;

injecting a polymeric material into said mold to encapsulate a portion of said glass window pane and a portion of said post with said polymeric material and to form a radial trim region integrally linking said end portion of said extruded elongated header trim strip to said resilient trim portion of said post with said polymeric material, said radial trim region adapted to seal a portion of said movable window pane;

allowing said injected polymeric material to cure to form an injection molded trim which encapsulates the edges of said glass window pane, a portion of said post and said end of said extruded elongated header strip to form an encapsulated fixed window pane assembly having an integral header strip; and removing said encapsulated fixed window pane assembly having an integral header strip from said mold.

13. The method of making a fixed window module for a motor vehicle recited in claim 12, wherein said post is roll-formed metal.

14. The method of making a fixed window module for a motor vehicle recited in claim 12, wherein the edges of said glass window pane are primed prior to placing said glass window pane in said window pane receiving space.

15. The method of making a fixed window module for a motor vehicle recited in claim 1, wherein said header trim strip has a length of from about 12 to about 36 inches.

16. The method of making a fixed window module for a motor vehicle recited in claim 12, wherein said polymeric material is selected from the group consisting of EPDM, SBR and other thermosets and thermoplastics and combinations thereof.

17. The method of making a fixed window module for a motor vehicle recited in claim 16, wherein said header trim strip and said resilient trim of said post are formed of the same material as said polymeric material.

18. The method of making a fixed window module for a motor vehicle recited in claim 12, wherein said post is co-extruded with said resilient trim portion.

19. The method of making a fixed window module for a motor vehicle recited in claim 12, wherein said header trim strip has a longitudinal axis and has a bend of about 90 to 110 degrees along said longitudinal axis forming a B-pillar portion and wherein said header trim strip is adapted to contact said movable window pane along at least two edges of said movable window pane.

20. The method of fabricating a fixed-pane motor vehicle window assembly recited in claim 3, wherein said-EPDM has an associated low friction coating region thereon.

* * * * *

UNITED STATES PATENT AND TRADEMARK OFFICE
CERTIFICATE OF CORRECTION

PATENT NO.   : 5,846,463
DATED        : December 8, 1998
INVENTOR(S)  : John D. Keeney and David S. Todd It is certified that error appears in the above-indentified patent and that said Letters Patent is hereby corrected as shown below:

Column 6, line 18, delete "2" and insert --4--
Column 6, line 33, delete "1" and insert --8--
Column 8, line 2, delete "1" and insert --12--

Signed and Sealed this

Twentieth Day of April, 1999

Attest:

Q. TODD DICKINSON

Attesting Officer    Acting Commissioner of Patents and Trademarks

UNITED STATES PATENT AND TRADEMARK OFFICE
CERTIFICATE OF CORRECTION

PATENT NO.   : 5,846,463
DATED        : December 8, 1998
INVENTOR(S)  : John D. keeney, et. al.

It is certified that error appears in the above-indentified patent and that said Letters Patent is hereby corrected as shown below:

Title page, item [73], Assignee:   insert --General Motors Corp., Detroit, Mich.--.

Signed and Sealed this

Nineteenth Day of October, 1999

Attest:

Q. TODD DICKINSON

Attesting Officer            Acting Commissioner of Patents and Trademarks